United States Patent
Maeda et al.

[11] Patent Number: 5,111,405
[45] Date of Patent: May 5, 1992

[54] ENGINE CONTROL SYSTEM

[75] Inventors: Yuji Maeda, Katsuta; Yozo Nakamura, Ibaraki; Kenichi Nakamura; Masami Nagano, both of Katsuta, all of Japan

[73] Assignee: Hitachi, Ltd., Tokyo, Japan

[21] Appl. No.: 534,948

[22] Filed: Jun. 8, 1990

[30] Foreign Application Priority Data

Jun. 13, 1989 [JP] Japan .................... 1-148411

[51] Int. Cl.$^5$ ............... G01M 15/00; F02D 41/26
[52] U.S. Cl. ................... 364/431.07; 364/565; 123/419; 123/436; 73/116
[58] Field of Search ........ 364/431.07, 431.08, 364/565, 551.01; 123/419, 436; 73/116, 119 A

[56] References Cited

U.S. PATENT DOCUMENTS

| | | | |
|---|---|---|---|
| 4,325,128 | 4/1982 | Abnett et al. | 364/511 |
| 4,357,662 | 11/1982 | Schira et al. | 364/431.08 |
| 4,375,668 | 3/1983 | Leung et al. | 364/431.08 |
| 4,494,509 | 1/1985 | Long | 123/419 |
| 4,498,438 | 2/1985 | Sato | 123/418 |
| 4,506,639 | 3/1985 | Murakami et al. | 123/339 |
| 4,532,592 | 7/1985 | Citron et al. | 364/431.07 |
| 4,550,595 | 11/1985 | Venema | 73/116 |
| 4,688,535 | 8/1987 | Küttner et al. | 123/419 X |
| 4,691,286 | 9/1987 | Obayashi et al. | 364/431.08 X |
| 4,691,288 | 9/1987 | Kay et al. | 364/431.01 X |
| 4,697,561 | 10/1987 | Citron | 364/431.07 |
| 4,779,214 | 10/1988 | Kinugasa | 364/565 |
| 4,843,870 | 7/1989 | Citron et al. | 73/116 |
| 4,882,695 | 11/1989 | Mieno et al. | 364/431.08 |
| 4,883,038 | 11/1989 | Nakaniwa | 123/436 |
| 4,899,282 | 2/1990 | Holmes | 364/431.08 |
| 4,936,277 | 6/1990 | Deutsch et al. | 123/436 |
| 4,995,139 | 2/1991 | Suzuki | 73/116 |

FOREIGN PATENT DOCUMENTS

| | | |
|---|---|---|
| 56-72258 | 6/1981 | Japan . |
| 2173925 | 10/1986 | United Kingdom . |
| 2183062 | 5/1987 | United Kingdom . |

Primary Examiner—Parshotam S. Lall
Assistant Examiner—Thomas S. Auchterlonie
Attorney, Agent, or Firm—Antonelli, Terry, Stout & Kraus

[57] ABSTRACT

In an engine control system of the type in which engine control data is calculated for each of a plurality of cylinders, rotation angular speeds of the crank shaft are sequentially detected as individual pistons of the plurality of cylinders take an identical, predetermined stroke position, for example, top speed position and rotation speed data and control data are calculated on the basis of the detected rotation angular speed.

12 Claims, 12 Drawing Sheets

| CYLINDER NO | THRESHOLD $N_i - \overline{N} = \sigma_i$ | CHANGE OF CONTROLLABLE QUANTITIES | |
|---|---|---|---|
| | | IGNITION TIMING | FUEL INJECTION QUANTITIES |
| 1 | $\sigma_1 < -X_4$ | ↗ ADVANCE | ↗ ENRICH |
| 3 | $-X_4 < \sigma_4 < X_4$ | → UNCHANGE | → UNCHANGE |
| 4 | $-X_4 < \sigma_4 < X_4$ | → UNCHANGE | → UNCHANGE |
| 2 | $X_4 < \sigma_2$ | ↘ LAG | ↘ LEAN |

$\overline{N}$: MEAN VALUE OF ANGULAR SPEED $N$ $\sigma_i$: DIFFERENCE BETWEEN MEAN VALUES OF ANGULAR SPEED OF INDIVIDUAL CYLINDERS (i = CYLINDER NO.)

$X_4$: THRESHOLD FOR DECIDING WHETHER CONTROLLABLE QUANTITY SHOULD BE CORRECTED AGAIN

ENGINE CONTROL SYSTEM

BACKGROUND OF THE INVENTION

The present invention relates to a control system for an internal combustion engine using a microcomputer and, more particularly, to an engine control system suitable for automobile gasoline engines.

The automobile engine, especially, an automobile gasoline engine, must satisfy stringent exhaust gas regulations and is required additionally to achieve sufficiently high performance. Therefore, in recent years, a control system for automobile gasoline engines has been available wherein various kinds of data representative of the running state of an engine, such as intake air flow rate for the engine and rotation speed thereof, are sequentially fetched, requisite control data for each cylinder is calculated on the basis of the fetched data, and the fuel supply amount and ignition timing are controlled independently for each cylinder on the basis of the control data. One may refer to examples of control systems disclosed in, for example, JP-A-58-185973, JP-A-59-49372 and JP-A-59-201972.

This type of control system needs data representative of the rotation speed of the engine, and in the prior art, a rotation speed derived from the period of a so-called reference angle position signal (REF signal) which is generated each time the crank shaft reaches a position of a predetermined angle of, for example, 180 degrees is used in common to cylinders as rotation speed data for calculation of engine control data.

The aforementioned prior art however fails to consider problems that the rotation speed of the engine contains irregular pulsations, detected data greatly differs depending on detection techniques and a delay in detection of the reference angle position signal which amounts to at least one period of the REF signal is inevitable. Therefore, when applied to a high-speed type engine having small rotational inertia, the prior art systems can not provide control data sufficiently reflecting differences in combustion state among cylinders, with the result that even control data independently prepared for each cylinder is used in vain to achieve sufficient suppression of roughness and satisfactorily optimum ignition timing control.

SUMMARY OF THE INVENTION

An object of the invention is to provide an engine control system which can make full use of the advantage of the type of system wherein various kinds of data representative of the running state of an engine are sequentially fetched, requisite control data for each cylinder is calculated on the basis of the fetched data and the fuel supply amount and ignition timing are controlled independently for each cylinder on the basis of the control data and which can achieve sufficient suppression of roughness and satisfactorily optimum ignition timing control.

According to the present invention, to accomplish the above object, rotation angular speeds (the term will be explained hereinafter) of the crankshaft are sequentially and independently detected as individual pistons of a plurality of cylinders take an identical, predetermined stroke position respectively, and rotation speed data for each cylinder is calculated on the basis of the crank rotation angular speed.

According to one aspect of the invention, there is provided an engine control system of the type in which control data necessary for controlling an engine is calculated for each of a plurality of cylinders, the control system comprising rotation angular speed detection means for sequentially and independently detecting rotation angular speeds of the crankshaft as individual pistons of the plurality of cylinders take an identical, predetermined stroke position, and rotation speed calculation means for calculating rotation speed data for each cylinder on the basis of the results of detection by the rotation angular speed detection means, the engine control data being calculated by using the rotation speed data for each cylinder.

The rotation angular speed of the engine crankshaft changes with the combustion state of each cylinder and pulsates. But the rotation speed data calculated from the crankshaft rotation angular speed detected independently for each cylinder as the piston of each cylinder takes the identical stroke position reflects sufficiently the combustion state of each cylinder. Then, control data for each cylinder is prepared independently for each cylinder on the basis of the rotation speed data and sufficiently accurate engine control can be ensured.

According to the invention, the unevenness in combustion among the cylinders can be taken care of satisfactorily to constantly permit proper control operation and therefore the engine performance can be extracted satisfactorily and besides stability during idle running can be improved considerably.

In addition, the unevenness in combustion during low speed running can be suppressed and consequently surging can be suppressed sufficiently to advantage.

DESCRIPTION OF THE PREFERRED EMBODIMENTS

An engine control system of the invention will now be described by way of example with reference to the accompanying drawings.

Figure 3:
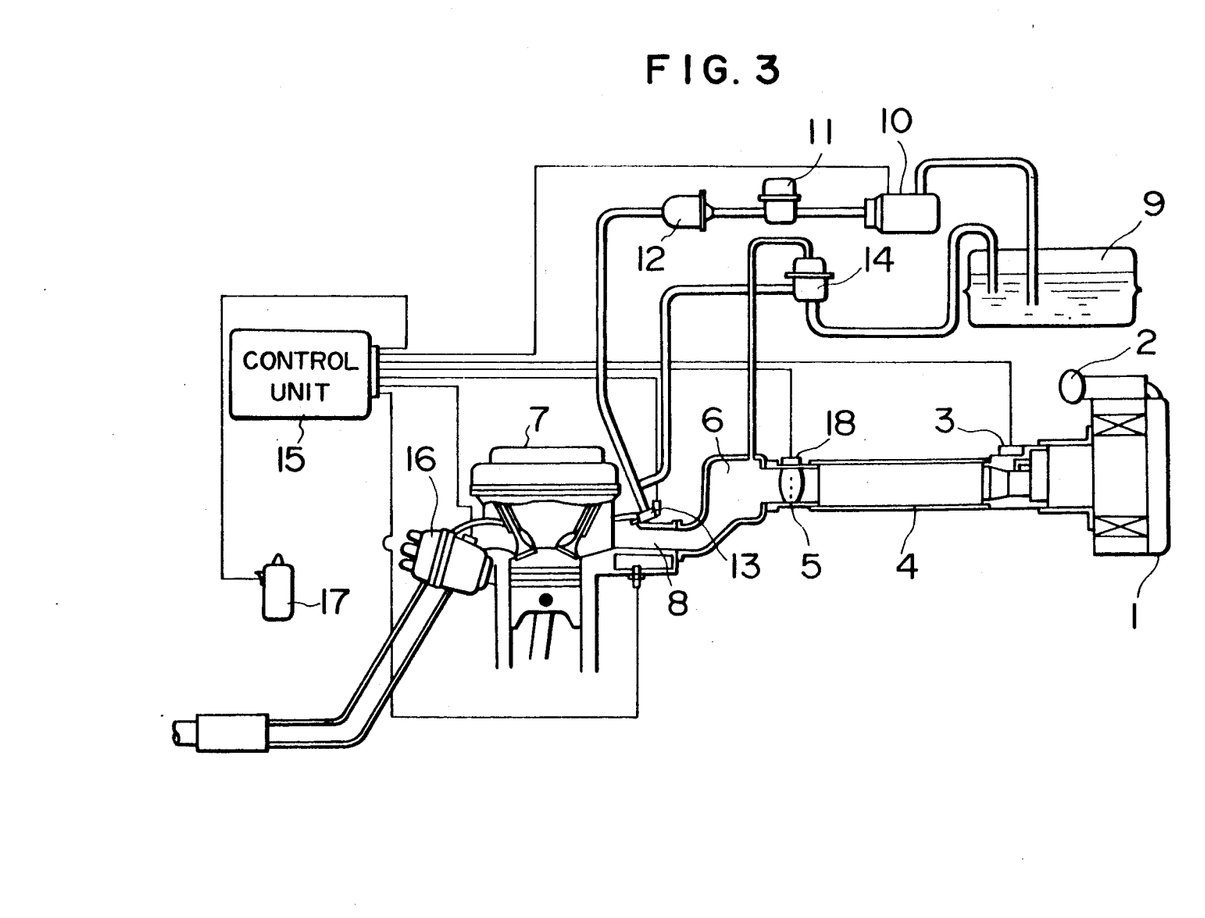
FIG. 3 is a diagram illustrating the construction of an example of an engine system to which the embodiment of the engine control system of the invention is applied.

FIG. 3 illustrates an example of an electronic fuel injection type engine control system to which the invention is applied. Referring to FIG. 3, air to be sucked into the engine is introduced through an intake 2 of an air cleaner 1 and it passes through a hot-wire air flow meter 3 for detecting the intake air flow rate, a duct 4 and a throttle valve body 5, in which a throttle valve for controlling the intake air flow rate is accommodated, to enter a collector 6. The intake air in the collector is distributed into intake manifolds 8 connected to individual cylinders of the engine 7 and is admitted into the cylinders.

On the other hand, such fuel as gasoline is pumped up from a fuel tank 9 by means of a fuel pump 10 and is supplied, after being pressurized, to a fuel system having a fuel damper 11, a fuel filter 12, a fuel injection valve (injector) 13 and a fuel pressure regulator 14. The fuel is regulated by the fuel pressure regulator 14 to have a predetermined pressure and is injected into the intake manifolds 8 through the fuel injection valves 13 provided in the intake manifolds 8 associated with the individual cylinders.

A signal representative of an intake air flow rate is delivered out of the air flow meter 3 and is applied to a control unit 15.

The throttle valve body 5 is mounted with a throttle sensor 18 for detecting the opening of the throttle valve 5 and an output signal of the sensor is also applied to the control unit 15.

Denoted by 16 is a distributor in which a crank angle sensor is comprised. The crank angle sensor delivers a reference angle signal REF representative of a reference rotation angle position and an angle signal POS representative of a rotation angle position detected at intervals of a small angle, for example, two degrees and these signals are also applied to the control unit 15.

Figure 4:
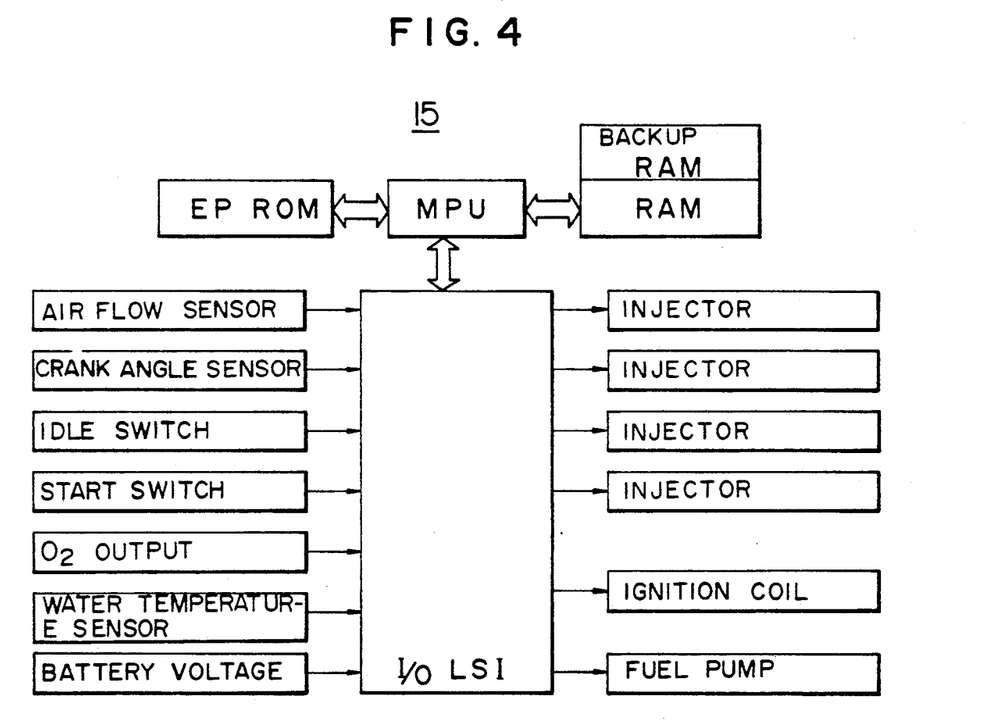
FIG. 4 is a block diagram showing an embodiment of a control unit.

The main component of the control unit 15 is a microcomputer constructed of an LSI including, as shown in FIG. 4, an MPU, a ROM, an A/D converter and an input/output circuit. The microcomputer fetches, as input signals, signals from various sensors for detection of the running state of the engine, such as the air flow meter 3, distributor 16 and throttle sensor 18, to execute a predetermined operation process and delivers various control signals representative of the operation results so that requisite control signals are supplied to the fuel injection valves 13 and ignition coils 17 to control the fuel supply amount and the ignition timing.

The control operation will now be described in greater detail.

Firstly, the number of pulses of the POS signal delivered by the crank angle sensor is counted for the purpose of detecting an angle position and the accuracy of the pulse position is not particularly high with the result that usually, the pulse generation interval may have relatively large errors. In addition, torque variations between strokes of the engine inherently result in unnecessary gaps, plays and distortion in the rotation transmission system. For these reasons, the pulse generation interval of the POS signal obtained through frequency-voltage conversion varies massively and relatively periodically having concomitant, very fine, irregular fluctuations, as shown at (a) in FIG. 5.

Figure 5:
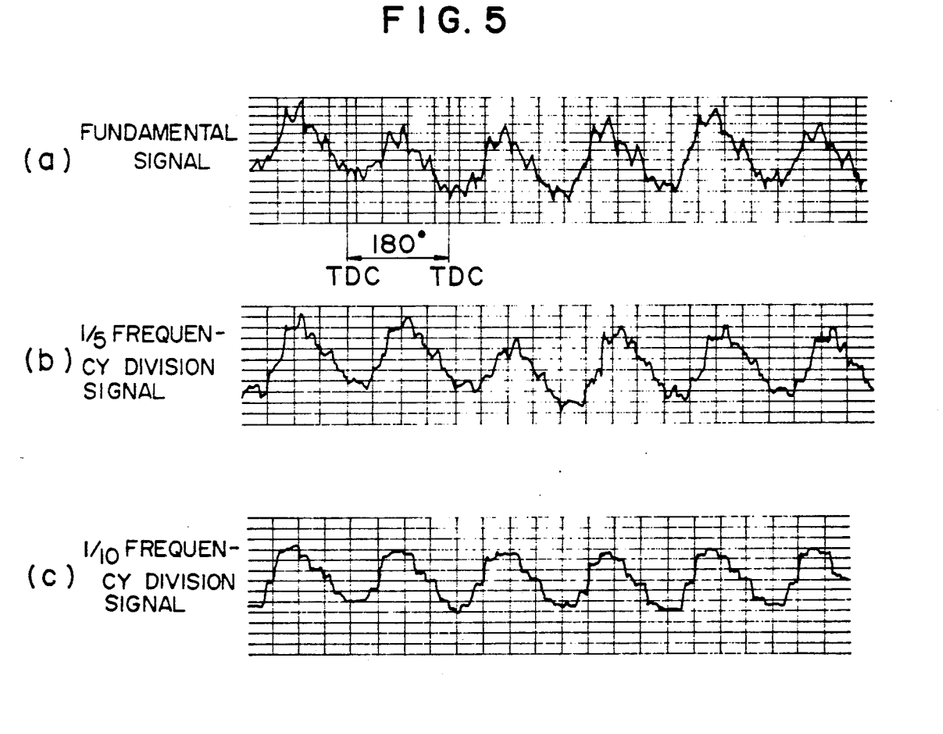
FIG. 5 is a waveform diagram for explaining variations in engine rotation number.

As will easily be seen from the graph at (a) in FIG. 5, if the engine rotation number (representative of the rotation speed) is detected directly based on the POS signal and is applied to the engine control processing which uses control data dedicated to the individual cylinders, satisfactory results cannot be obtained.

However, when the POS signal as such is subjected to frequency division so as to be filtered, in effect, its irregular fluctuations can be removed and a relatively smoothed waveform can be obtained as shown at (b) or (c) in FIG. 5, which can be used for controlling the individual cylinders. This signifies that crankshaft speeds at different rotation angles (hereinafter referred to as rotation angular speeds) may advantageously be detected over a predetermined range of rotation angle of the crankshaft in an averaging way of a regular sampling by frequency division to provide a mean rotation angular speed which is used for control operation. Additionally, FIG. 5 shows at (b) the results of 1/5 frequency division and at (c) the results of 1/10 frequency division.

Thus, according to the invention, in order to eliminate the influence of the variations, rotation angular speeds of the crankshaft are detected within a predetermined range which spreads around a predetermined time point on the engine stroke.

The predetermined range may be determined desirably but more preferably it may be set up such that a time point at which a peak of rotation angular speed of the engine crankshaft occurs falls within the range, as will be described below with reference to FIG. 6.

Figure 6:
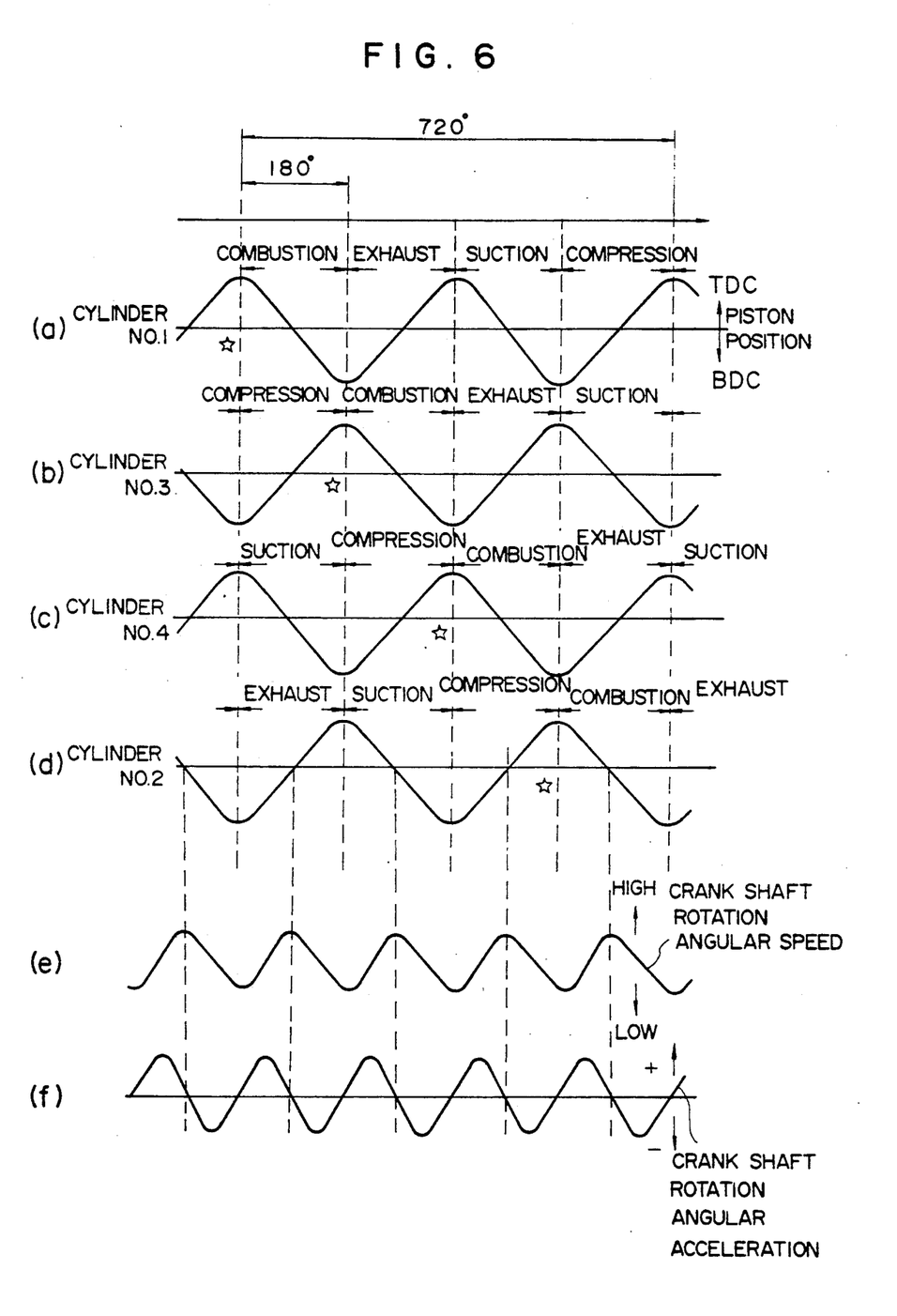
FIG. 6 is a diagram showing the relation between the engine rotation number and the stroke.

As well known in the art, the automobile gasoline engine to which the present invention is principally applied is of four-cycle type and in the 4-cycle engine, the respective strokes of suction, compression, combustion and exhaust are repeated for each cylinder as shown at (a) to (d) in FIG. 6 so that as viewed from the whole of the engine, combustion takes place each time the crankshaft rotates through an angle which is obtained by dividing an angle through which the crankshaft makes two turns of rotation, that is, 720 degrees by the number of cylinders, the thus obtained angle amounting to 180° for a four-cylinder engine, for example. At that time, the combustion pressure also varies and eventually the engine crankshaft assumes the rotation angular speed which varies as shown at (e) in FIG. 6 and the rotation angular acceleration as shown at (f) in FIG. 6.

As will be readily seen from FIG. 6, the rotation angular speed assumes a peak value at a time point at which the rotation angular acceleration of the crankshaft is inverted from positive to negative, that is, at a substantially mid time point between the top and bottom dead centers of the combustion stroke.

The peak value of crankshaft rotation angular speed depends on torque generated in a cylinder which is currently under combustion stroke. Therefore, the peak rotation angular speed developed at the crank shaft during the combustion stroke of each cylinder eventually reflects the combustion state of each cylinder, indicating that, by detecting the rotation number of the engine at a time point at which the peak rotation angular speed of the crankshaft occurs, the combustion state of the engine can be determined most correctly.

With the foregoing presupposed, the engine rotation number detecting operation according to an embodiment of the invention will now be described.

Figure 1:
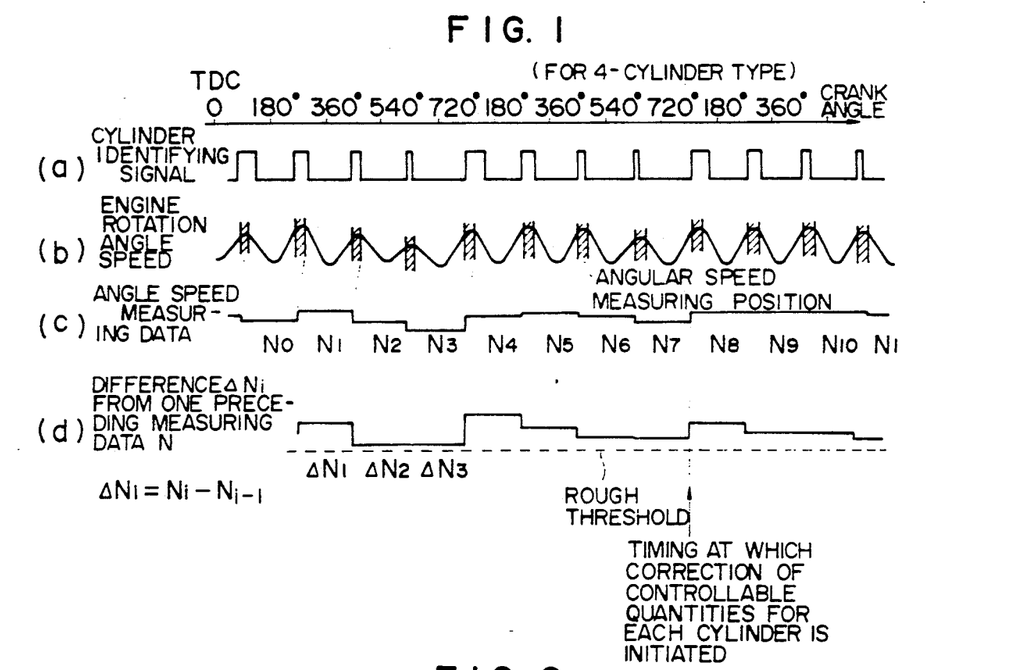
FIG. 1 is a timing chart useful to explain the operation of an engine control system according to an embodiment of the invention.

As described previously, without particular design consideration, combustion in the engine is uneven from one cylinder to another and without exception, some cylinders produce good combustion and some cylinders produce bad combustion, with the result that the peak rotation angular speed of the engine crankshaft varies greatly as shown at (b) in FIG. 1. The varying peak rotation angular speed represents the combustion state of each engine and according to the invention, in order to detect the peak rotation angular speed, angular speed measuring positions are set as shown at (b) in FIG. 1 and angular speed data N (N0, N1, N2, ........ Nn) is measured at intervals of the measuring positions as shown at (c) in FIG. 1 and is stored sequentially.

Figure 2:
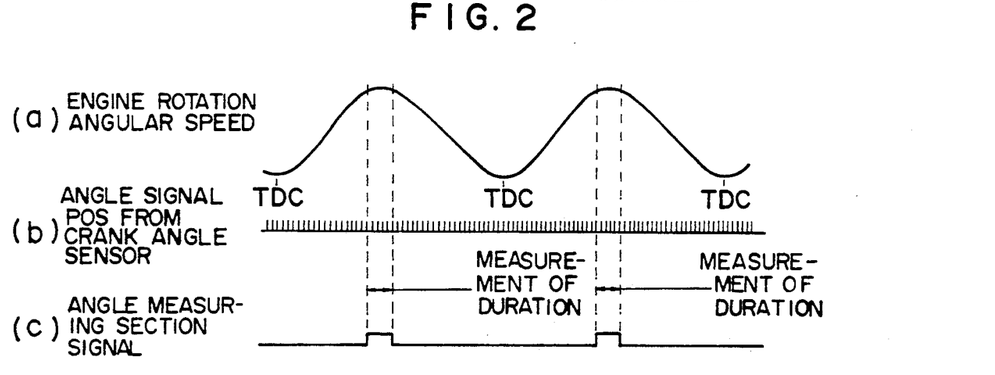
FIG. 2 is a waveform diagram useful to explain the operation of the engine control system.

This operation will be described in greater detail with reference to FIG. 2. Firstly, as shown at (c) in FIG. 2, there is generated an angle measuring section signal which rises to an ON state during only a section spaced from the top dead center (TDC) by a crankshaft angle of, for example, 80 to 100 degrees, and the duration of the measuring section signal (ON time) is measured so that angular speed data may be calculated from the reciprocal of the measured duration. In this respect, the crank angle sensor comprised in the distributor 16 described previously with reference to FIG. 3 is also designed so as to generate the angle measuring section signal.

In an alternative, the angular speed data N may be determined by using the POS signal in such a manner that, after a predetermined number of pulses of the POS signal, for example, 80 pulses beginning with the REF signal, are detected, an interval of time over which a predetermined number of pulses of the POS signal, for example, 20 pulses are counted is measured. In a further alternative, intake negative pressure Pc of the engine and data LDATA directly indicating the load may be used to conduct map retrieval.

The thus calculated angular speed data N is stored in tables of data N (hereinafter referred to as data N tables) provided in association with the individual cylinders under the direction of a cylinder identifying signal as shown at (a) in FIG. 1. Each time that pieces of data N for all of the cylinders are completed, in particular, at the time that data N7 is calculated in the illustration of FIG. 1, the data is then stored in data N averaging tables provided in association with the individual cylinders. Data averaging is adopted with the aim of decreasing error even in the event that combustion is unstable and the number of data pieces to be averaged is not limited to 8 exemplified as above. In FIG. 1, when data N7 is fetched, it is determined that the number of data pieces reaches a prescribed averaging number and the data pieces for all the cylinders are stored in the averaging tables, thereby ensuring that the controllable quantities can be corrected, beginning with an instant at which data N8 develops, to make uniform peak angular speeds of the individual cylinders.

Figure 8:
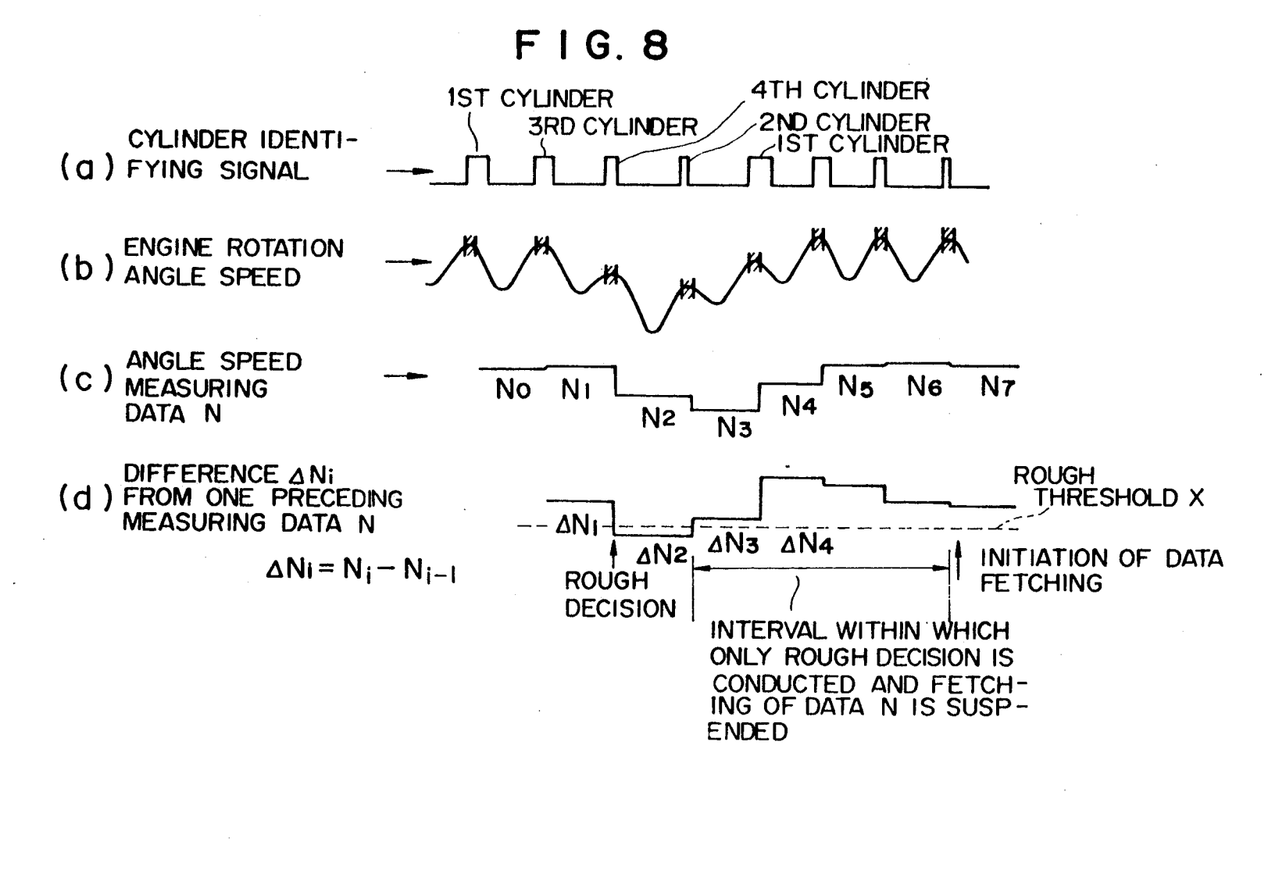
FIG. 8 is a timing chart for explaining data fetching operation.

Incidentally, there is a problem that a large amount of roughness (non-uniform combustion) sometimes takes place. For example, when roughness occurs so that the engine rotation angular speed greatly falls after data N2 as shown at (b) in FIG. 8, data N3 and data N4 following the data N2 apparently falls greatly as shown at (c) in FIG. 8 because of continuity of speed. In that case, however, the depression of data is not due to actually defective combustion and if the data N is fetched as it is, there results a large error.

Under the circumstances, the present embodiment employs a countermeasure for preventing the error due to the generation of roughness. More particularly, as soon as data Ni is fetched, a difference $\Delta N_i$ between the data $N_i$ and data $N_{i-1}$ which occurs at one preceding measuring position, that is, $\Delta N_i = N_i - N_{i-1}$ where i is a data number, is calculated as shown at (d) in FIG. 8, the generation of a roughness is examined by deciding whether the difference $N_i$ exceeds a predetermined threshold $\times$ ($\Delta N_i \geq x$), and when roughness generation is determined, fetching of data N for a cylinder in question and the ensuing cylinders is temporarily suspended. Then, data fetching is initiated at a position for the following cylinder next to the cylinder in question at which roughness occurs, thereby minimizing the loss of data.

Accordingly, in accordance with this embodiment, the generation of an error due to roughness can be suppressed sufficiently to insure highly accurate control.

The above control operation is executed in part of an engine processing executed by the control unit (FIG. 4). Thus, the operation of the engine control processing inclusive of the rough control will now be described.

Figure 9:
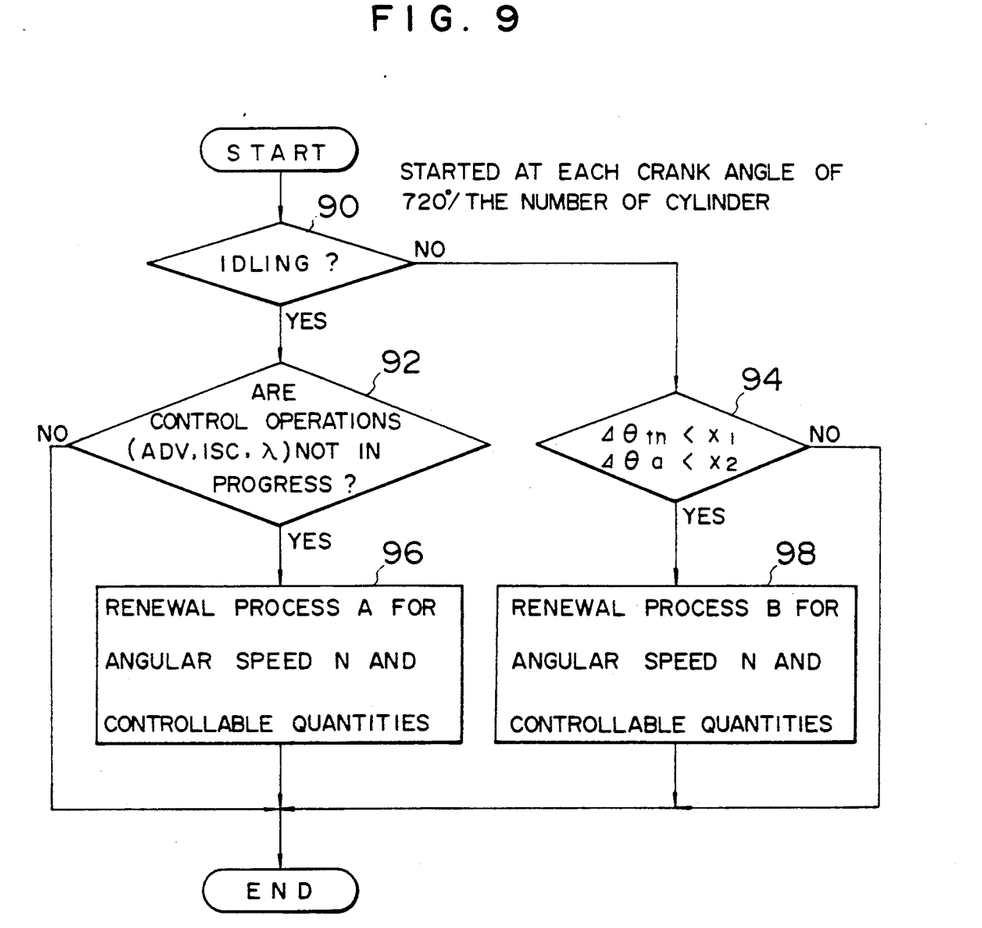
FIGS. 9, 10, 11, 12 and 13 are flow charts for explaining the operation of the engine control system of the invention.

Since the contents of engine control greatly depend on whether the engine is in an idle state in this embodiment, a check operation is first initiated at each crank angle (720 degrees/the number of cylinders) as shown in FIG. 9 to examine, in step 90, whether the engine is in an idle state. If the idle state is determined, the procedure proceeds to step 92 in which it is decided that the ignition control, idle speed control and air/fuel ratio control are not in progress to settle the condition for permitting the execution of control according to the invention. This is because, if these control operations are in progress, one control operation affects another to make the data N inaccurate. Thus, it is determined in step 92 that each control operation is not executed, and the procedure proceeds to a renewal process routine A of step 96.

Even with the engine not being in an idle state, as far as it is in a low load running region, the change in throttle opening and the change in intake air are examined in step 94 with a view of ensuring accuracy of fetching of data N, thereby settling the condition of the changes being below predetermined thresholds x1 and x2 for permitting the execution of control according to the invention. Accordingly, when YES is the result of the decision step 94, the procedure proceeds to a renewal process routine B of step 98.

Figure 10:
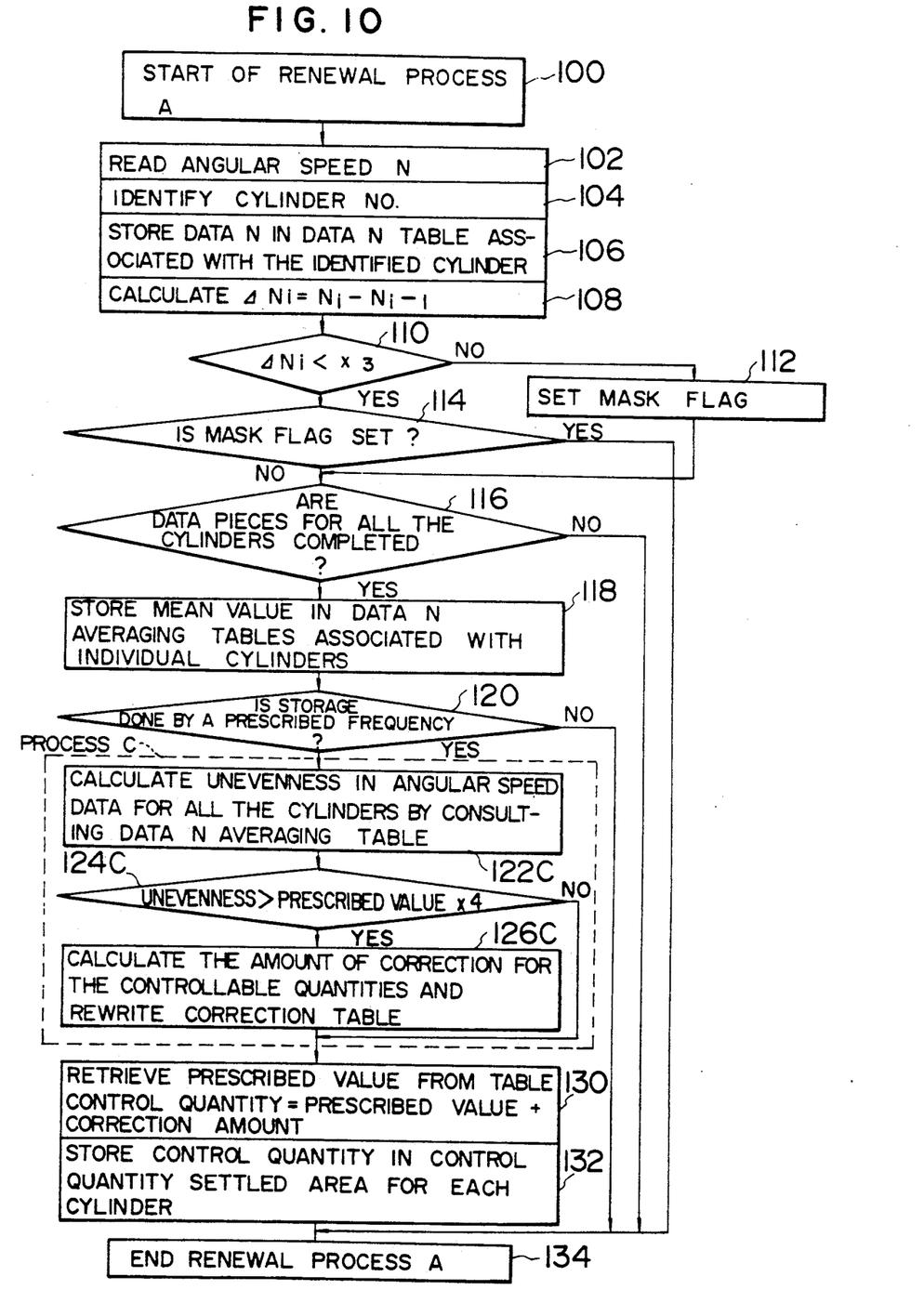
Figure 11:
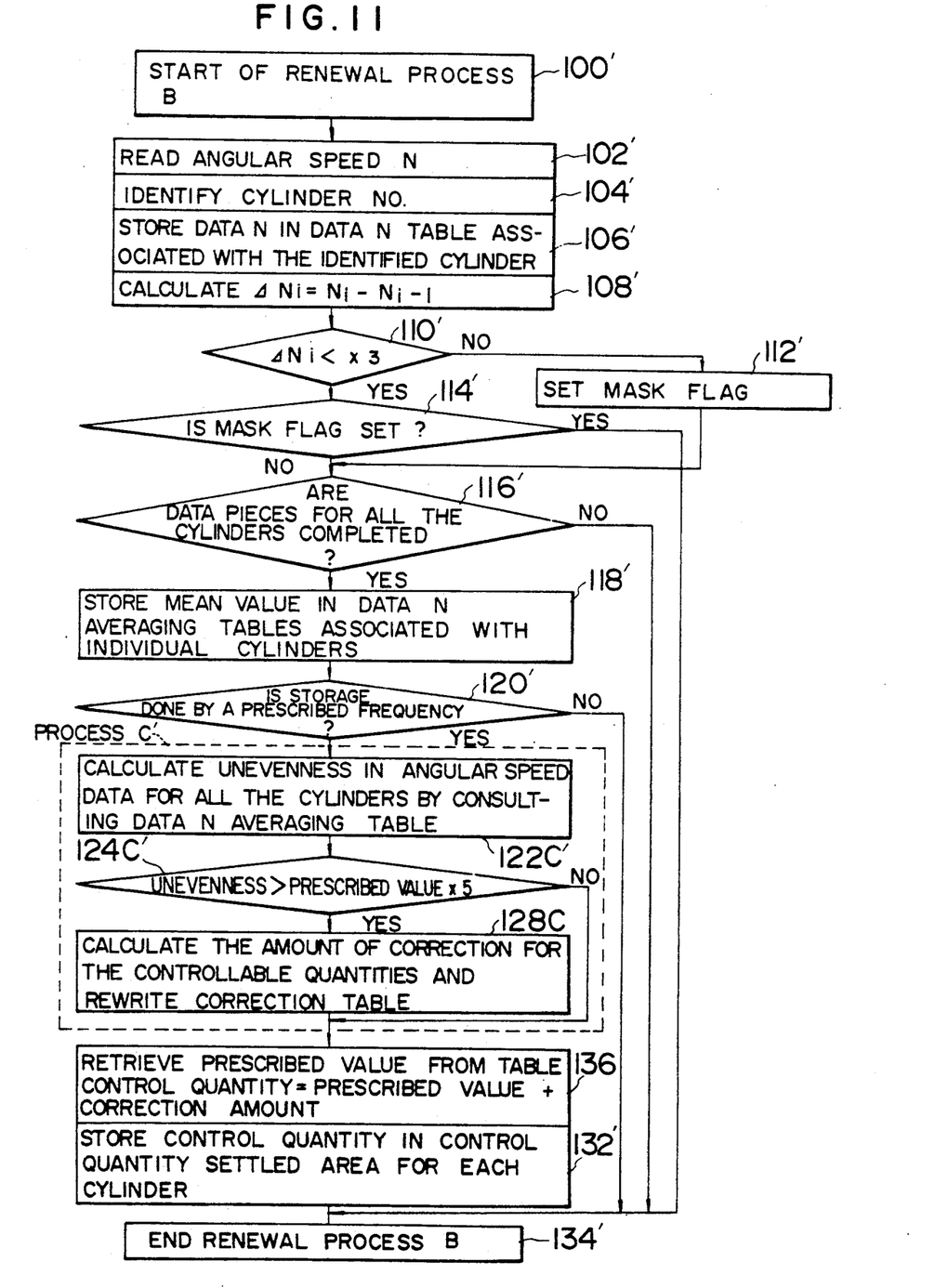

The process A in step 96 is detailed in FIG. 10 and the process B in step 98 is detailed in FIG. 11. In these processes, engine rotation number data for the individual cylinders is calculated and executed.

If YES is the result of the decision step 92 in FIG. 9, the procedure proceeds to the renewal process routine A as detailed in FIG. 10. In step 102, current angular speed data $N_i$ based on the aforementioned angle measuring section signal or POS signal and REF signal is read, in step 104 a cylinder of interest is identified in accordance with the cylinder identifying signal as shown at (a) in FIG. 1, in step 106 the data $N_i$ read in step 102 is stored in a data N table associated with the cylinder of interest, and in step 108 the data N table of interest is used to calculate a difference $N_i = N_i - N_{i-1}$ where $N_{i-1}$ represents angular speed data stored at one preceding position and $N_i$ represents angular speed data currently stored. In step 110, it is determined whether $\Delta N_i$ is smaller than a predetermined value x3 and if not smaller, the procedure proceeds to step 112 where a mask flag is set and then to step 116. But if smaller, the procedure proceeds to step 114 where it is decided whether a mask flag is set. With the flag set, the procedure proceeds to step 134 where the renewal process ends. Then, after the crankshaft has run through a predetermined crank angle, the routine of FIG. 9 resumes. With the flag unset, the procedure proceeds to step 116 where it is decided whether data $N_i$ is stored in the data N tables associated with the individual cylinders. If storage is not completed, the procedure proceeds to step 134 and the routine of FIG. 9 resumes, but if storage of data $N_i$ in the data N tables for all the cylinders is completed, the procedure proceeds to step 118 where the stored data N pieces are averaged to provide a mean value which is stored in data N averaging tables associated with the individual cylinders. In step 120, it is checked whether the storage of mean value into the data N averaging table is carried out at a prescribed frequency (in this example, 4 corresponding to the number of cylinders). If the answer is "NO", the procedure proceeds to step 134 but, it "YES", to a routine C where unevenness in angular speed data N is decided and the amount of correction for the controllable quantities is calculated. The routine C includes a step 122C in which unevenness in angular speed data N for all the cylinders is calculated by consulting the data N averaging table, a step 124C in which it is determined whether the calculated unevenness value is greater than a prescribed value x4, and a step 126C in which the amount of correction for the controllable quantities is calculated when the unevenness exceeds the prescribed value x4 to rewrite the correction table. This process routine C will be further detailed in FIG. 12. If the calculated unevenness value is determined to be larger than the prescribed value x4 in step 124C, the procedure proceeds to step 126C where, in order to decrease the unevenness under the idle running condition to below the prescribed value x4, the corresponding control correction amount is calculated pursuant to a calculation formula which is precedently determined in accordance with the degree of unevenness and the running condition and the correction table corresponding to control items (ignition timing and the like) for each cylinder is renewed by the calculated value. If NO is the result of the decision step 124C, the procedure jumps over step 126C and proceeds to step 130. In step 130, a prescribed value complying with the running condition is retrieved from a table set up for each cylinder and the retrieved value is added to the calculated correction amount to provide a control quantity. The procedure then proceeds to step 132 where the control quantity corresponding to the running condition is stored in a control quantity settled area for each cylinder and thereafter to the end step 134.

Processing operations in the step 98 are shown in FIG. 11 and they are identical to those shown in FIG. 10 excepting steps 128C and 136. Steps in FIG. 11 identical to those in FIG. 10 are designated by identical reference characters suffixed with a dash. Accordingly, in step 128C, in order to decrease the calculated unevenness value under the low load running condition to below a prescribed value x5, the corresponding control correction amount is calculated pursuant to a calculation formula which is precedently determined in accordance with the degree of unevenness and the running condition and the correction map corresponding to control items for each cylinder is renewed. Then, the procedure proceeds to step 136. If in step 124C' the calculated unevenness value is determined to be smaller than the prescribed value x5, the procedure jumps over the step 128C and proceeds to step 136. In step 136, a prescribed value complying with the running condition is retrieved from a map set up for each cylinder and the retrieved value is added to the calculated correction amount to provide a control quantity. The procedure then proceeds to step 132' where the control quantity corresponding to the running condition is stored in a control quantity settled area for each cylinder.

Figure 12:
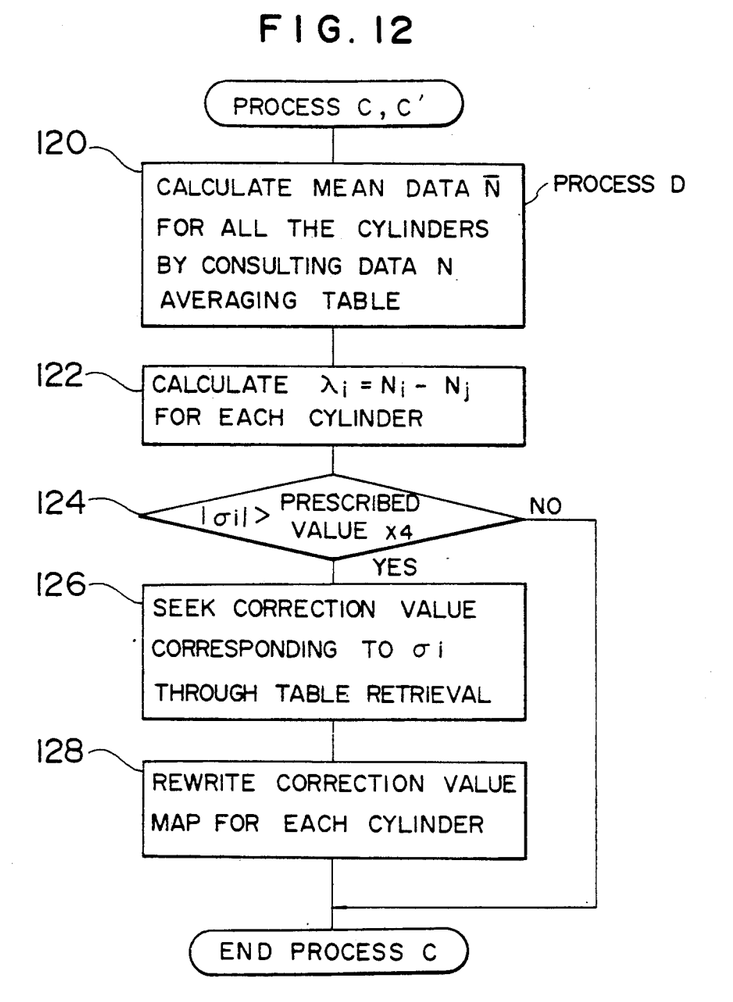

Details of the processes C and C' in the aforementioned process routines A and B are shown in FIG. 12. Firstly, in step 120, mean data $\overline{N}$, indicated by Nj, for all the cylinders is calculated by consulting the data N averaging table.

Subsequently, in step 122, a difference $\sigma_i = N_i - Nj$ for each cylinder is calculated.

In step 124, it is determined whether the difference $|\sigma_i|$ exceeds the predetermined threshold x4 and if it is determined to be in excess of x4, indicating that the unevenness among cylinders is excessive, a process of correcting the control quantities for ignition timing control and fuel injection control is executed in steps 126 and 128.

More specifically, in step 126, a correction value corresponding to the difference $\sigma_i$ is first sought through table retrieval and the procedure proceeds to step 128 where rewrite of the correction value table is executed on the basis of the retrieved correction value when idle control in the process A is in progress but when low load running in the process B is in progress, a rewrite of the correction value map is executed on the basis of the retrieved correction value.

Figure 13:
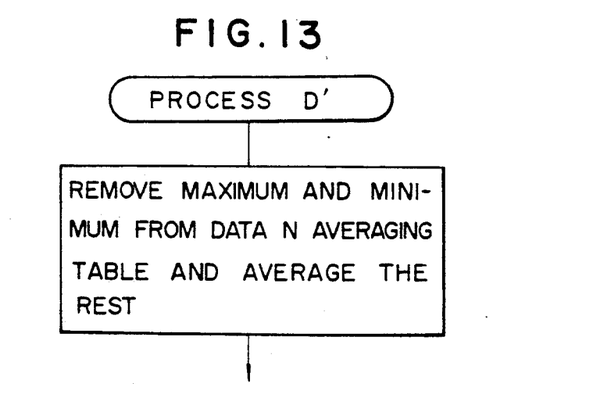

Process D executed in step 120 is for calculating the mean $N_j$ of data N for all the cylinders and this process may be replaced with process D' shown in FIG. 13. In the process D', data obtained through the table retrieval is first removed of maximum and minimum values and the rest is averaged.

Objects to be treated as the controllable quantities will now be described.

Figure 7:
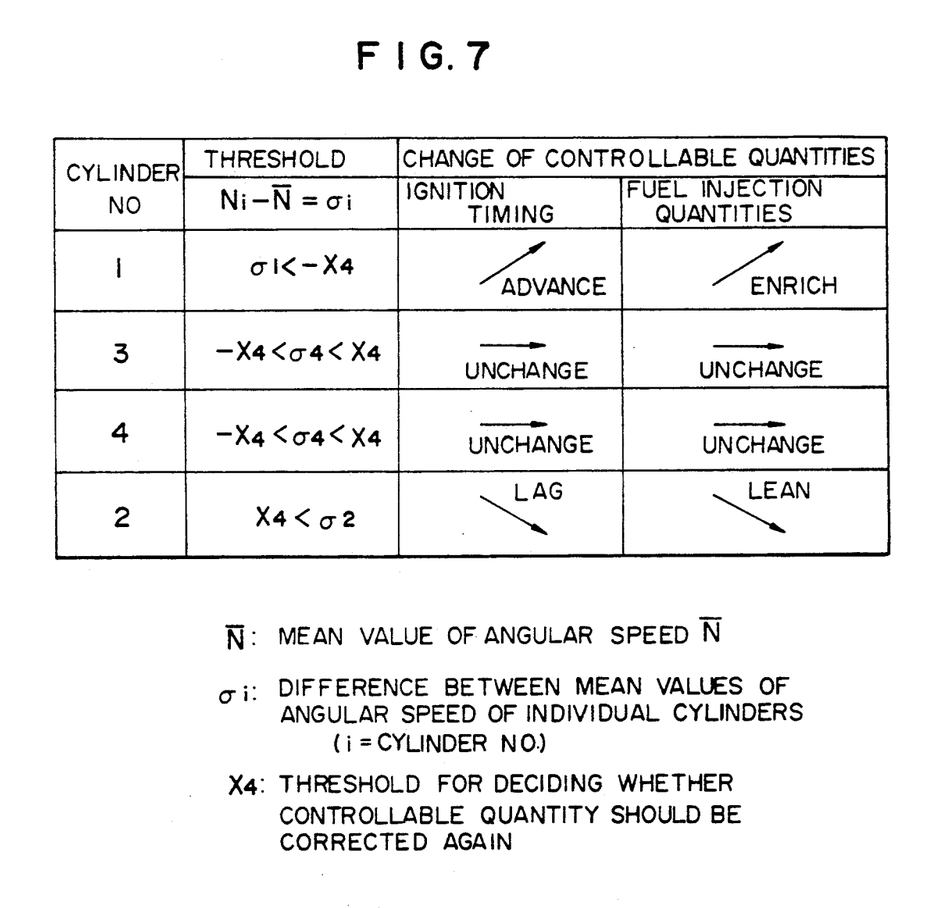
FIG. 7 is a table for explaining controllable quantities of the engine.

Treated as controllable quantities in the engine are ignition timing AVD and fuel injection quantity as shown in FIG. 7 because these quantities act as principal parameters which cause torque to change.

However, in grading these parameters, the ignition timing control having ability to extensively control torque without greatly affecting exaust gas is preferential to the fuel injection quantity control and it is preferable that the fuel injection quantity control be added if satisfactory effects can not be obtained only with the ignition timing control. Obviously, the invention is not limited to such preferential control.

Incidentally, the control operation according to this embodiment is applicable to not only idle state but also low speed running and control operation for the low speed running is preferably carried out on condition that throttle opening $\theta$th and intake flow rate Qa are maintained constant for a predetermined time (time required for at least one cycle to elapse), in order that surging liable to occur during transition from idling to low speed running can be suppressed effectively.

In the case where the control operation is limitedly applied to the idle state and the microcomputer in the control unit 15 has a margin, the target rotation number for engine control may be set by averaging data for each cylinder several times to provide mean values, removing maximum and minimum values of the mean values therefrom and averaging the rest.

In this manner, a very stable decision criterion or threshold can be obtained to permit more suitable control.

If, even through the above process, the occurrence of surging during low speed running can not be prevented completely, the following method may preferably be employed. More particularly, the engine rotation number Ne is detected every 180 degrees of engine rotation angle and differences ΔNe between adjacent rotation numbers detected at intervals of 180 degrees are sequentially calculated to provide a series of rotation number differences ΔNe. Then, the resonant frequency of surging which is inherent in the vehicle can be predicted from an inflection point on the series of rotation number differences. Therefore, the inflection point is detected and used to control ignition timing such that torque in opposite phase to that of torque variation due to surging can be generated from the engine, thereby suppressing surging effectively. Since the above method does not require control for each cylinder, it suffices that only torque is controlled sequentially.

Figure 14:
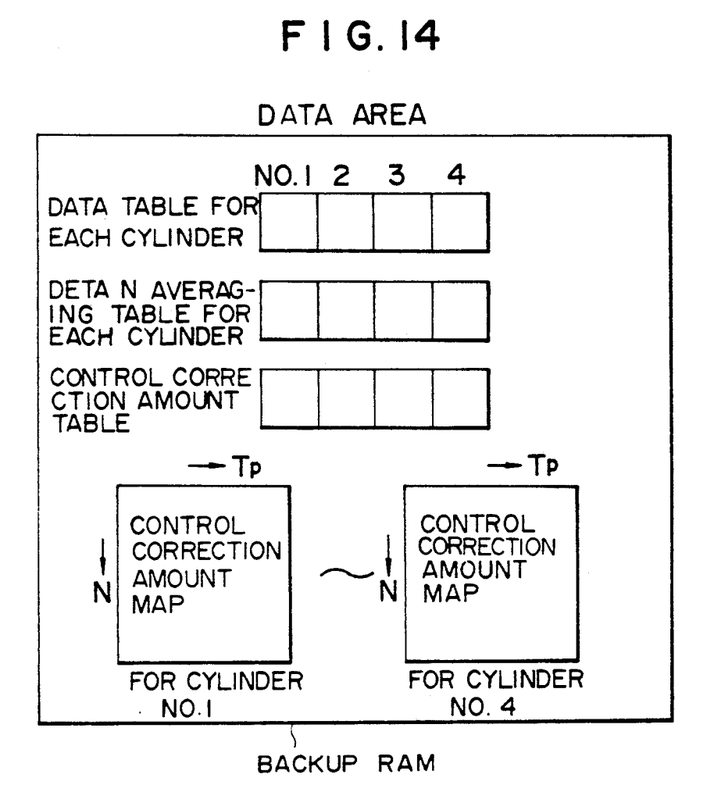
FIG. 14 is a diagram for explaining a backup RAM.

In the foregoing embodiment, various kinds of data are tabulated and used and more specifically, stored in a backup RAM as shown in FIG. 14 and rewritten sequentially for use.

Accordingly, in accordance with the foregoing embodiment, each time the operation of the engine resumes, learning effects derived from control data which has been corrected till then can be acquired and accurate control can exactly be expected without exception.

In this case, the control quantity for each cylinder consists of a fundamental value represented by data which is predetermined for each vehicle and a correction value represented by data calculated in accordance with the invention and it is stored in separate maps for idle control and low speed running control. Control quantities calculated from data N are sequentially added to map data.

In detecting the surging resonant frequency, data N is fetched as time series data and when an inflection point is detected, a maximum value and a minimum value which are associated with the inflection point are fetched and, at the same time, positions of the maximum and minimum values are stored in terms of a count of the number of data pieces. Then, the difference between the maximum value and minimum value is divided by the data number confined within the interval to provide a division value. When the division value exceeds a prescribed value, the change in data N is determined to be of periodic variation so that ignition timing control may be carried out in such a manner that opposite-phase torque for surging suppression can be obtained. The surging resonant frequency can be predicted vehicle by vehicle because the resonance is mechanical and can be measured in advance. Therefore, it is also possible to depend upon an alternative method of deciding whether the periodic variation is of the resonant frequency by deciding whether the division value obtained by dividing the difference between the maximum and minimum values by the interval data number exceeds the prescribed value, whereby accuracy of decision can be promoted.

Figure 15:
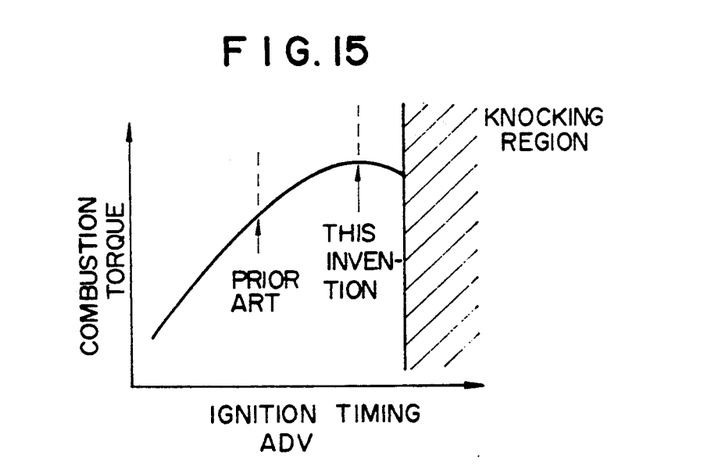
FIG. 15 is a graphic representation for explaining the effects of the invention.

Incidentally, in order to extract the performance of the engine to an extreme, it is necessary to advance the ignition timing until the knocking generation limit. Conventionally, however, unevenness in the combustion state among cylinders is taken into account to force the ignition advance angle value to have a margin as shown in FIG. 15. On the other hand, in accordance with the foregoing embodiment, each cylinder can be controlled to comply with its combustion state to lessen the margin even when the generation of knocking is taken into account, as indicated also in FIG. 15 and consequently extraction of the engine performance to an extreme can be facilitated.

We claim:

1. An engine control system of a type in which engine control data necessary for controlling at least one of ignition timing and fuel supply amount of an engine is calculated for each of a plurality of cylinders, said control system comprising:

rotation angular speed detection means for sequentially and independently detecting rotation angular speeds of the engine crankshaft during timing periods of substantially identical predetermined crankshaft rotation angle having a duration within 720/2N which straddle the point of highest crankshaft rotation speed for each cylinder (N indicating the number of cylinders of the engine); and data calculation means for calculating rotation speed data for each cylinder in response to angular speeds detected by said rotation angular speed detection means during said timing periods which straddle only said point of highest crankshaft rotation speed, said engine control data being calculated by using the rotation speed-dependent data for each cylinder.

2. An engine control system according to claim 1, wherein said timing periods of substantially identical predetermined crankshaft rotation angle each are substantially centered on positions at which the torque of a cylinder inverts from positive to negative during the combustion stroke in the direction of rotation.

3. An engine control system according to claim 2 further comprising means for advancing ignition timing for a cylinder at a speed lower than a target rotation speed and retarding ignition timing for a cylinder at a speed higher than the target rotation speed, so as to minimize the unevenness in rotation speed among cylinders.

4. An engine control system according to claim 2, wherein said rotation angular speed detection means comprises means for generating an angle measuring section signal at a time spaced from the top dead center by a predetermined crank angle, said signal having a duration corresponding to said predetermined crankshaft rotation angle, and means for determining the time length of said duration so as to detect angular speed data.

5. An engine control system according to claim 2 further comprising means for measuring, after a predetermined number of pulses of a POS signal beginning with a REF signal are detected, an interval of time during which a predetermined number of pulses of the POS signal are counted, so as to detect angular speed data.

6. An engine control system according to claim 2, wherein said timing periods of substantially identical predetermined crankshaft rotation angle have a duration within 720/2N (N indicating the number of cylinders of the engine).

7. An engine control system according to claim 6, wherein the duration of said timing periods is 40° of angular rotation of the crankshaft.

8. An engine control system according to claim 1, wherein said timing periods of substantially identical predetermined crankshaft rotation angle are substantially centered at a mid position between the top and bottom dead centers of the combustion stroke.

9. An engine control system of a type in which engine control data necessary for controlling at least one of ignition timing and fuel supply amount of an engine is calculated for each of a plurality of cylinders, said control system comprising:

rotation angular speed detection means for sequentially and independently detecting rotation angular speeds of the engine crankshaft during timing periods of substantially identical predetermined crankshaft rotation angle;

data calculation means for calculating rotation speed data for each cylinder in response to angular speeds detected by said rotation angular speed detection means, said engine control data being calculated by using the rotation speed-dependent data for each cylinder; and means for suspending data detection for a predetermined time when a difference $\Delta N_i$ between angular speed data $N_i$ detected for a current timing period i and angular speed data $N_{i-1}$ detected for an immediately preceding timing period i-1 exceeds a predetermined value and resuming data detection at a cylinder succeeding a cylinder at which the data $N_i$ is detected.

10. An engine control system of a type in which engine control data necessary for controlling at least one of ignition timing and fuel supply amount of an engine is calculated for each of a plurality of cylinders, said control system comprising:

rotation angular speed detection means for sequentially and independently detecting rotation angular speeds of the engine crankshaft during timing periods of substantially identical predetermined crankshaft rotation angle having a duration within 720/2N only in the vicinity of highest crankshaft rotation speed for each cylinder (N indicating the number of cylinders of the engine); and data calculation means for calculating rotation speed data for each cylinder in response to angular speeds detected by said rotation angular speed detection means, said engine control data being calculated by using the rotation speed-dependent data for each cylinder.

11. An engine control system according to claim 10, wherein said timing periods of substantially identical predetermined crankshaft rotation angle each are substantially centered on positions at which the torque of a cylinder inverts from positive to negative during the combustion stroke in the direction of rotation.

12. An engine control system according to claim 10, wherein said timing periods of substantially identical predetermined crankshaft rotation angle are substantially centered at a mid position between the top and bottom dead centers of the combustion stroke.

* * * * *